No. 857,207. PATENTED JUNE 18, 1907.
S. C. SCHAUER.
STOP MECHANISM FOR DRILL PRESSES.
APPLICATION FILED FEB. 18, 1907.
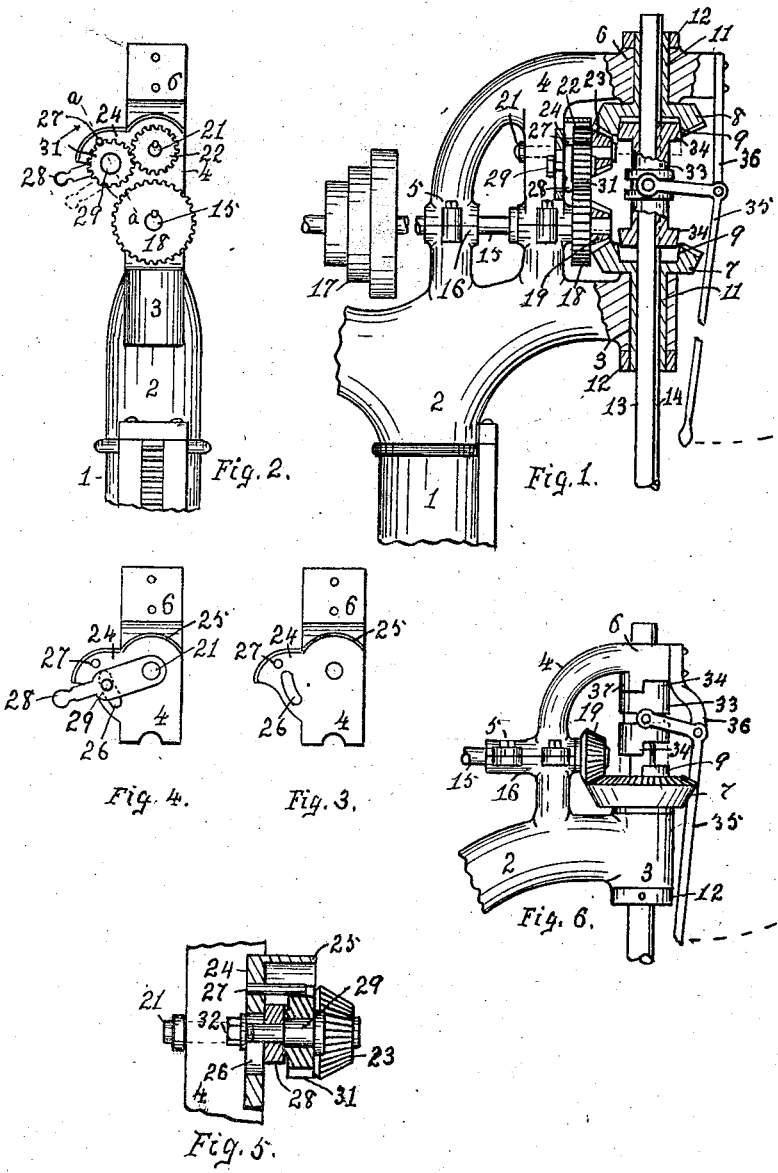
WITNESSES, Sherman C. Schauer, INVENTOR,
By Robert S. Carr,
Atty.

UNITED STATES PATENT OFFICE.

SHERMAN C. SCHAUER, OF CINCINNATI, OHIO, ASSIGNOR TO THE CINCINNATI MACHINE TOOL COMPANY, OF CINCINNATI, OHIO, A COPARTNERSHIP.

STOP MECHANISM FOR DRILL-PRESSES.

No. 857,207.  Specification of Letters Patent.  Patented June 18, 1907.

Application filed February 18, 1907. Serial No. 357,842.

*To all whom it may concern:*

Be it known that I, SHERMAN C. SCHAUER, a citizen of the United States, residing at Cincinnati, Ohio, have invented a new and useful Improvement in Stop Mechanism for Drill-Presses, of which the following is a specification.

My invention relates to stop mechanism for drill presses and the objects of my improvement are to provide means for instantly stopping the rotation of the spindle when it is disengaged from the driving mechanism and for maintaining it in the locked position until it is again reëngaged with said mechanism. These objects are attained in the following described manner as illustrated in the accompanying drawings, in which:—

Figure 1 is a side elevation with parts in section and parts broken away of a drill press provided with reversing gears and embodying my improvements; Fig. 2, a front elevation with parts removed; Figs. 3 and 4 front elevations of the removable bracket, the latter showing the idler shifting arm; Fig. 5, parts in section on the line *a—a* of Fig. 2 and Fig. 6 the side elevation of parts of a drill press without reversing gears and embodying my improvement.

In the drawings, 1 represents the column of an upright drill press, 2 the top yoke supported thereon and provided with vertical bearing 3, and 4 a bracket removably secured to the top yoke by means of cap screws 5 and provided with a bearing 6 in alinement with said bearing 3.

Similar bevel gears 7 and 8 are each provided with a clutch member 9 and with a projecting hub 11 whereby they are journaled in the respective bearings 3 and 6 and wherein they are retained by means of collars 12. A spindle 13 provided with a spline groove 14 is rotatatively inserted through the axial bore of said gears and longitudinally adjustable therethrough by the usual mechanism (not shown). A driving shaft 15 journaled on the top yoke in bearings 16 is provided with a pulley 17, a spur gear 18 and a bevel pinion 19 in continuous mesh with bevel gear 7. A shaft 21 journaled in the bracket 4 is provided with a spur gear 22 preferably smaller than gear 18 and with a bevel pinion 23 similar to pinion 19 which meshes continuously with bevel gear 8.

A flange 24 which projects laterally from one side of bracket 4 and flush with its face is provided with a gear hood 25, with a curved slot 26 concentric with shaft 21, and with a fixed stop or pin 27 projecting forwardly therefrom. A shifting arm 28 swiveled at one end concentric with shaft 21 is provided with a stud or spindle 29 which carries on one end an idle spur gear 31 in continuous mesh with gear 22. Said stud is movably extended at the other end through slot 26 in flange 24 and nut 32 is adjustably threaded thereon for immovably clamping arm 28 against the flange in its different positions of adjustment. Said arm is adjustable with gear 31 into engagement with gear 18 for simultaneously rotating gear 8 in the opposite direction from gear 7. It is also adjustable with gear 31 into engagement with the fixed stop 27 for locking gear 8 from being rotated in either direction.

A sleeve 33 provided with clutch members 34 on its respective ends is splined on spindle 13 between bevel gears 7 and 8. A bell crank hand lever 35 pivoted in a fixed plate 36 which depends from bracket 4 serves to move sleeve 33 into engagement with either of the gears 7 or 8. During the engagement of the sleeve with gear 7 the spindle 13 will be rotated in a forward direction, and during its engagement with gear 8, the spindle will be rotated at an accelerated speed and in a rearward direction, provided the idle gear 31 is engaged with gear 18. Should the engagement of the sleeve with gear 8 occur during the engagement of idler 31 with the fixed stop 27 the spindle 13 will be thereby instantly stopped and locked in non-rotative position.

In drill presses of the class not provided with gear reversing mechanism, as shown in Fig. 6, the bevel gear 8 with its clutch member 9 may be dispensed with and a fixed clutch member 37 substituted therefor on the bracket and adapted to engage with the corresponding clutch member 34 on the sleeve for locking the spindle 13 in non-rotative position.

The clutches may be either of the friction or positive class as desired but I prefer to use the friction clutches like the one shown and described in Patent No. 756,185 granted to me on March 29, 1904.

Having fully described my improvement, what I claim as my invention and desire to secure by Letters Patent of the United States is:—

1. The combination of a driven gear, a fixed stop, a longitudinally movable spindle, and means for engaging the spindle alternately with the gear and with the stop.

2. The combination of a driven gear, a fixed stop, a longitudinally movable spindle, a sleeve splined thereon, and means for moving the sleeve in engagement with the gear and with the stop.

3. The combination of a driven gear provided with a clutch member, a spindle rotatively and longitudinally movable therein, a sleeve splined thereon and provided with a clutch member adapted to engage with the gear for rotating the spindle, and means for preventing the rotation of the sleeve when disengaged from the gear.

4. The combination of a top yoke, a driven gear, a longitudinally movable spindle, a bracket removably secured on the yoke, and means for detachably engaging the spindle with the bracket and with the gear.

5. The combination of a spindle, a driving and a reversing gear therefor, means for detachably engaging the spindle with either of said gears, and means for locking one of said gears in a non-rotative position.

6. The combination of a spindle, a driving and a reversing gear therefor, means for detachably engaging the spindle with either of said gears, a fixed stop, a train of gears connecting said gears together, and means for disconnecting a portion of said train from the driving gear and engaging it with the fixed stop.

7. The combination of a driving shaft provided with a spur gear and with a bevel pinion, a bevel gear engaging with the pinion, a secondary shaft provided with a smaller spur gear and with a bevel pinion, a bevel gear engaging with said latter pinion, a fixed stop, an idle spur gear in continuous engagement with one of said spur gears, means for detachably engaging said idle gear with said other spur gear and with the stop, a spindle, and means for detachably engaging either of said bevel gears therewith.

8. The combination of a longitudinally movable spindle, a rotative and a non-rotative member, mounted concentric therewith at fixed points, and means for detachably engaging the spindle with said members.

9. The combination of a longitudinally movable spindle, a rotative and a stationary member mounted concentric therewith at fixed points, and means for engaging the spindle with said members alternately.

10. The combination of a longitudinally movable spindle, a rotative member, a non-rotative member, and means for detachably engaging the spindle with either of said members at any point in its longitudinal movement.

11. The combination of a longitudinally movable spindle, a rotative and a non-rotative member mounted concentric therewith at fixed points, and means for engaging the spindle in different rotative or longitudinal positions with either of said members.

12. The combination of a longitudinally and rotatively movable spindle, a rotative driving member therefor, a non-rotative member, and means for detachably engaging the spindle in any rotative or longitudinal position with either of said members.

13. The combination of a longitudinally and rotatively movable spindle, a rotative member, a non-rotative member, and means for engaging the spindle in any of its longitudinal or rotative positions with said members alternately.

SHERMAN C. SCHAUER.

Witnesses:
 AUG. H. TUECHTER,
 R. S. CARR.